Figure 1:
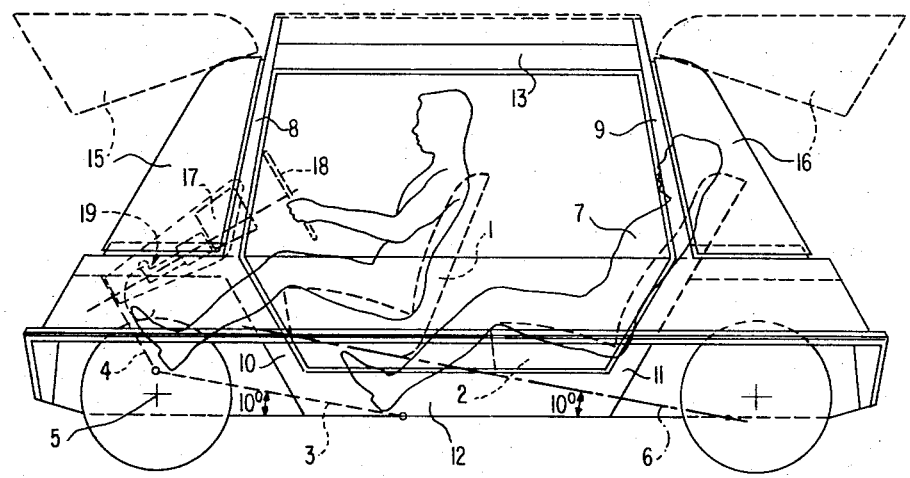

INVENTORS
BELA BARÉNYI
BRUNO SACCO

Dicke + Craig
ATTORNEYS

United States Patent Office 3,352,597
Patented Nov. 14, 1967

3,352,597
MOTOR VEHICLE
Béla Barényi, Stuttgart-Vaihingen, and Bruno Sacco, Sindelfingen, Germany, assignors to Daimler-Benz Aktiengesellschaft, Stuttgart-Unterturkheim, Germany
Filed July 14, 1964, Ser. No. 382,481
Claims priority, application Germany, July 23, 1963,
D 42,064
11 Claims. (Cl. 296—28)

The present invention relates to a passenger motor vehicle, especially to a compact vehicle with a rear engine, which is provided with two doors and four seats distributed over two rows.

With the usual vehicles of this type the seats are distributed two each over the two rows and the doors are normally disposed in the area of the first seat row. Such an arrangement requires a certain minimum length of the vehicle which must be maintained if the boarding conditions are not to be impaired and made worse in an intolerable manner and if the rear seats are to be usable for grown-up persons. A large number of compact cars already fall short of these limits, that is, these minimum limits have not been maintained with the same; the rear seats are then only utilizable, at best, for children. Nevertheless, even these latter types of prior art compact motor vehicles still have a considerable body length which is still considered excessive for many purposes, particularly in city traffic with its considerable parking problems.

The present invention is based on the task to create a four-seater motor vehicle with particularly small constructional length, in which all four seats are easily reached and offer a good comfort, especially as regards freedom for the knees and freedom of movement for the legs of the passengers seated in the rear seat, as is not generally present even in the considerably larger vehicles of the middle class.

This task and the underlying problems thereof are solved in accordance with the present invention in that only a centrally arranged driver-seat is provided in the first row and three passenger seats are provided in the second row, and the driver-seat is arranged higher, preferably considerably higher than the passenger seats and pushed forwardly to such an extent that the line of intersection between the sheet metal floor board and the sheet metal pedal board comes to lie approximately above the front axle. As a result of the higher arrangement of the driver-seat, on the one hand, the distance thereof with respect to the foot pedal floor board may be decreased and, on the other the distance between the driver-seat and the passenger seat disposed therebehind may be kept relatively small without decreasing the freedom of movement of the legs of the passengers. This is due to the fact that the rear edge of the driver-seat comes to lie relatively high with respect to the seat cushions of the passenger seats and a relatively larger foot space is created thereby. A particularly favorable arrangement results, if the seat cushions of the forward and rear seats are disposed in a common plane inclined downwardly toward the rear by about 10° with respect to the horizontal. The sheet metal floor board of the vehicle may rise correspondingly approximately from the place, where the feet of the persons seated on the passenger seats normally rest, up to the foot pedal floor board member by an angle of about 10° with respect to the horizontal.

Notwithstanding the relatively slight construction length of the vehicle realizable by the application of the present invention, the boarding conditions are excellent because the spaces present alongside the driver-seat render the driver-seat as well as the passenger seats easily accessible. It is thereby particularly appropriate if the door apertures extend approximately from a transverse plane contacting the forward edge of the driver-seat up to a transverse plane determined by the back rests of the passenger seats.

Accordingly, it is an object of the present invention to provide a compact motor vehicle, particularly a compact rear-engine, passenger motor vehicle which obviates by simple means the shortcomings and drawbacks encountered with the prior art constructions.

Another object of the present invention resides in the provision of a compact passenger motor vehicle which permits a considerably reduced length of the vehicle body without impairing the accessibility of the vehicle, the seating comfort for the driver and passengers, and in particular, the leg room available for the passengers in the rear seats.

Another object of the present invention resides in the provision of a four-passenger compact motor vehicle in which all seats are designed to accommodate grown-up persons yet is of such small overall length that it can be readily used in city driving.

Still another object of the present invention resides in the provision of a four-passenger motor vehicle that is of such short length that it may be readily parked yet accommodates four grown-up persons who can board and leave the vehicle without any difficulties.

Still a further object of the present invention resides in the provision of a passenger motor vehicle provided with two rows of seats which is so constructed and arranged as to offer also particular comfort to the passengers of the rear seat row without requiring a relatively great length in overall dimensions of the body.

A further object of the present invention resides in the provision of a multi-passenger motor vehicle which assures considerably improved leg room to all passengers notwithstanding the compact design of the vehicle.

Another object of the present invention resides in the provision of a four-passenger motor vehicle having two rows of seats, in which the distance between the two rows can be kept relatively small without detrimentally affecting the leg room of the passengers seated in the back row.

Figure 2:
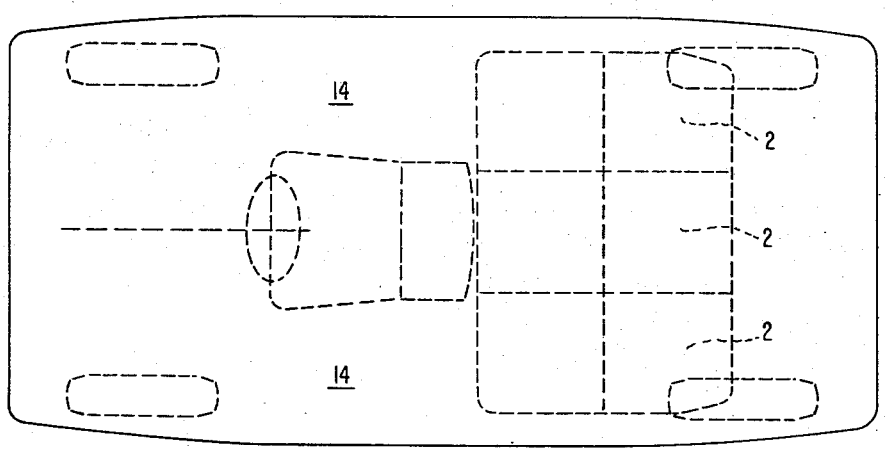

These and further objects, features and advantages of the present invention will become more obvious from the following description when taken in connection with the accompanying drawing which shows for purposes of illustration only, one embodiment in accordance with the present invention, and wherein:

FIGURE 1 is a schematic side elevational view of a passenger motor vehicle in accordance with the present invention, and FIGURE 2 is a schematic plan view of the vehicle of FIGURE 1.

Referring now to the drawing wherein like reference numerals are used throughout the two views to designate like parts, the passenger motor vehicle illustrated therein which has a very short wheel base, has four seating places which are arranged in two rows, evenly distributed over the space between the wheels. In the forward row only the driver-seat 1 is arranged in the center of the vehicle, whereas three passenger seats 2 are disposed in the second row. The driver-seat 1 is thereby pushed forwardly to such an extent that the place of the intersection of the usual sheet metal floor board 3 and the sheet metal pedal floor board 4, which are both indicated in FIGURE 1 in dash lines, comes to lie approximately above the front axle 5. Additionally, the driver-seat 1 is arranged so high that its seating cushion and the seating cushions of the rear seats 2 come to lie in a common plane 6 which is inclined rearwardly and downwardly by an angle of about 10° with the horizontal. As may be readily recognized from FIGURE 1, a leg space of considerable dimension is gained by this measure for the passengers 7 which occupy the passenger seats 2, without having to make the distance between the seats particularly large. The seats 1 and 2, in contrast, may be moved closer together as compared to those vehicles known in the prior art. The sheet metal floor board 3 rises from the point, where the feet of the persons 7 occupying the passenger seats 2 normally come to rest, in the direction towards the sheet metal pedal floor board 4 with the same inclination as the plane 6 common to the two seating rows, that is, in the illustrated embodiment by 10°. The arrangement in accordance with the present invention furthermore permits to give or assign to the backrests of the passenger seats 2 an inclination of about 60°. This inclination of 60° permits an extraordinarily comfortable seating and is accepted as ideal value which cannot be attained as a rule even with luxury vehicles because the constructional length required thereby cannot be justified.

Notwithstanding the very short construction of the vehicle according to the present invention the boarding into the same is very comfortable. The door aperture of the vehicle is delimited by the rising columns 8 and 9 which in combination with the longitudinal bearers 12, the adjoining upwardly extending parts 10 and the roof bearer 13 form a very stable and sturdy frame. The door apertures accordingly extend approximately from a plane contacting the forward edge of the driver-seat 1 up to a transverse plane determined by the back rests of the passenger seats 2 so that the persons using the vehicle can easily enter and step on the surfaces 14 disposed alongside the driver-seat 1 and from there can occupy without difficulties their passenger seats.

Over and above the aforementioned advantages, the vehicle according to the present invention also offers excellent visibility conditions by the arrangement of large-surfaced and possibly tiltable or pivotable front and rear windows 15 and 16 in combination with large-surfaced window panes in the doors. Sufficient space remains behind the passenger seats 2 for the accommodation of a rear engine, whereby a luggage space may still be arranged above the engine in case of a relatively shallow, flat construction of the engine; the luggage space may additionally become accessible upon opening of the rear window 16, for instance, by pivoting the same into the position shown in FIGURE 1 in dash lines.

In the vehicle according to the present invention the seats, particularly also the seat cushion of the driver-seat 1 are not adjustable. An adaptation to the body size of the driver can be realized by an adjustment of the instrument panel 17 together with the steering wheel 18 and by an adjustment of the pedals and of the other operating devices and installations. Since such adjustment can be realized in any conventional manner, known per se in the prior art, for instance by suitable guide means and/or adjustable linkages and/or telescoping arrangements of the parts, a detailed description and showing thereof is dispensed with herein. For example, the steering wheel 18 can be arranged so as to be axially adjustable and/or swingable, as is well known, and the instrument panel 17 may be raised or lowered in the direction of the steering column by any conventional guide means provided with suitable clamping or fastening means for example, also in such a manner as to adjust the instrument panel 17 simultaneously with and in the same direction as the steering wheel 18. The foot pedals may be adjusted by a suitable guide means, extensible linkages and/or telescoping arrangements. Suitable means for providing such adjustments are indicated, diagrammatically at 19.

While we have shown and described one embodiment in accordance with the present invention, it is understood that the same is not limited thereto but is susceptible of numerous changes and modifications as known to a person skilled in the art, and we therefore do not wish to be limited to the details shown and described herein but intend to cover all such changes and modifications as are encompassed by the scope of the appended claims.

We claim:
1. A passenger motor vehicle, especially a compact vehicle with rear engine, having front and rear axle means, a body with two doors, and four seating places within said body and distributed over two seat rows, comprising a single centrally arranged driver-seat provided in the first row, three passenger seats provided in the second row, said driver-seat being elevated considerably with respect to said passenger seats, and floor means including a floor board and a foot pedal board angularly disposed with respect to said floor board, said floor means located so that the line defined by the intersection of the plane of said floor board and the plane of said foot pedal board lies approximately above said front axle means and is parallel thereto, said driver-seat being located behind and above said intersection of said floor board and said foot pedal board so as to provide for the most convenient seating position for the normal driver, said floor board rising in the direction of said foot pedal board from a point approximately below the rear edge of said driver-seat, the remaining portion of said floor board extending substantially horizontally, whereby ample room for the feet of passengers is provided below the elevated driver-seat.

2. A vehicle according to claim 1, further comprising seat cushion means for each seat, the cushion means of the front and rear seats being disposed in a common plane inclined downwardly and rearwardly with respect to the horizontal by an angle of about 10°.

3. A vehicle according to claim 1, further comprising fixedly mounted seat cushion means, means for operating the vehicle including a steering wheel, foot pedals, and manually operable means, and means for adjusting said steering wheel, said foot pedals, and said manually operable means for adapting the same to the size of the body of the driver.

4. A vehicle according to claim 1 wherein said body is provided with door apertures from a cross plane contacting approximately the forward edge of the driver-seat up to a cross plane determined by the back rest of the passenger seat.

5. A vehicle according to claim 1, further comprising seat cushion means for each seat, the cushion means of the front and rear seats being disposed and a common plane inclined downwardly and rearwardly with respect to the horizontal by an angle of about 10°, said floor board rising in the direction towards the foot pedal board by an angle of about 10° with respect to the horizontal, from a place approximately where the feet of a normal person seated in a passenger seat would normally come to rest.

6. A vehicle according to claim 5, wherein said body is provided with door apertures extending from a cross plane contacting approximately the forward edge of the driver-seat up to a cross plane determined by the back rest of the passenger seats.

7. A vehicle according to claim 6, wherein said seat cushion means are fixedly mounted, means for operating the vehicle including a steering wheel, foot pedals, and manually operable means, and means for adjusting said steering wheel, said foot pedals, and said manually operable means for adopting the same to the size of the body of the driver.

8. In a passenger motor vehicle having a body provided with floor means, with two doors and with two rows of seats forming a driver-seat and three passenger seats, and front and rear axle means for the front and rear wheels of the vehicle, the improvement essentially consisting of only a single substantially centrally-arranged seat forming the driver-seat in the front row and three passenger seats in the rear row, with the driver-seat being disposed higher than the passenger seats, the floor means including two portions disposed at an angle to each other and defining the leg space for the driver, one of said portions forming part of the floor board and the other portion forming part of the foot pedal board, the intersection of said floor board and said foot pedal board being located approximately above said front axle means, and said driver seat being located behind and above the intersection of said floor board and said foot pedal board so as to provide for the most convenient seating position for the normal driver, said floor board rising upwardly and forwardly by an angle of about 10 degrees with respect to the horizontal, from a place approximately below the rear edge of the driver-seat, the remaining portion of said floor board extending substantially horizontally, whereby ample room for the feet of passengers is provided below said driver-seat.

9. A vehicle according to claim 8, wherein each seat is provided with a seat cushion, the cushions of the front and rear seats being disposed substantially in a common plane inclined downwardly and rearwardly with respect to the horizontal.

10. A vehicle according to claim 8, wherein each seat is provided with a seat cushion, the cushions of the front and rear seats being disposed substantially in a common plane inclined downwardly and rearwardly with respect to the horizontal, said floor board portion rising upwardly and forwardly with respect to the horizontal by an angle of about 10° from a place approximately below the rear edge of the driver-seat.

11. A vehicle according to claim 8 wherein each seat is provided with a seat cushion, the cushions of the front and rear seats being disposed substantially in a common plane inclined downwardly and rearwardly with respect to the horizontal, said floor board portion rising upwardly and forwardly with respect to the horizontal, from a place approximately below the rear edge of the driver-seat, and a plurality of operating and control elements for driving the vehicle including a steering wheel, an instrument panel, and foot pedals, the driver-seat being fixed, and means for adapting the driver-seat to the size of the driver by adjusting the operating and control elements normally used by the driver.

References Cited

UNITED STATES PATENTS

| | | | |
|---|---|---|---|
| 2,190,218 | 2/1937 | Paton | 296—64 |
| 2,857,977 | 10/1958 | Bock | 180—89 |
| 3,061,361 | 10/1962 | Barenyi | 296—28 |

FOREIGN PATENTS

| | | |
|---|---|---|
| 1,175,867 | 11/1958 | France. |
| 728,207 | 4/1955 | Great Britain. |
| 846,207 | 8/1960 | Great Britain. |

BENJAMIN HERSH, *Primary Examiner.*

J. A. PEKAR, *Assistant Examiner.*